Jan. 7, 1941.  H. T. KELSH ET AL  2,227,835
PUNCHING MACHINE
Filed May 24, 1939  3 Sheets-Sheet 1
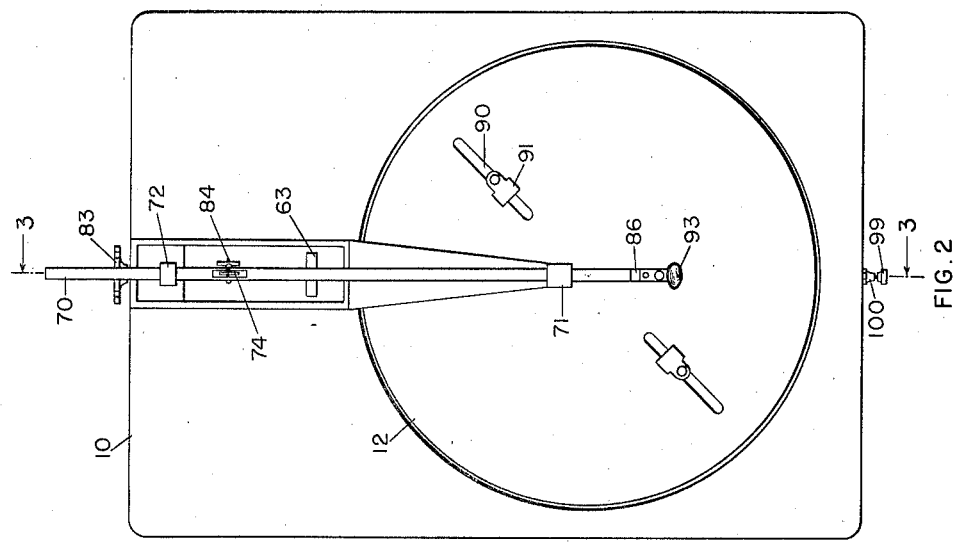
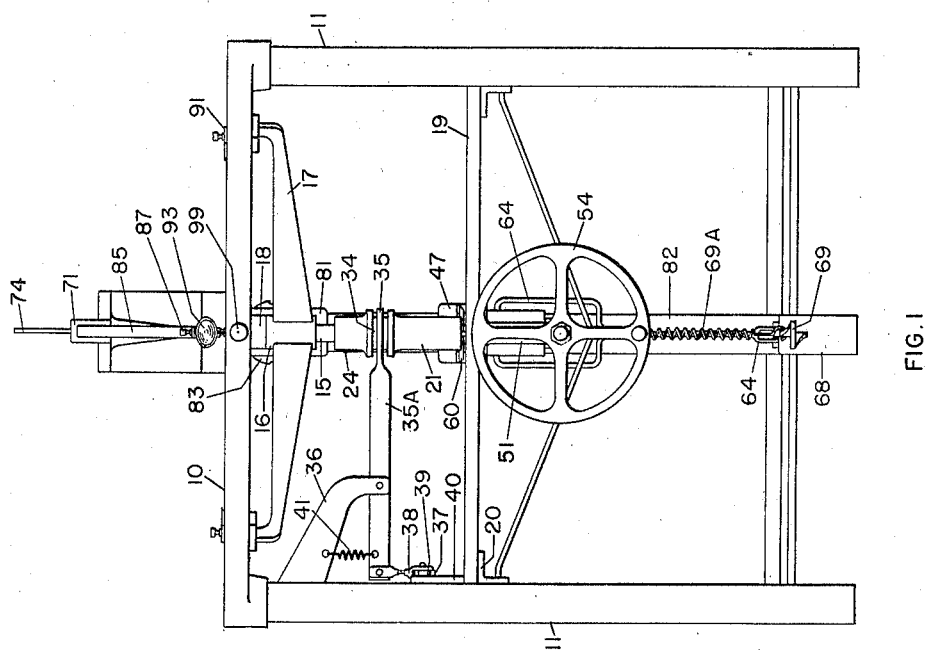
Inventors
Harry T. Kelsh
Edward W. Magruder
By
Attorneys

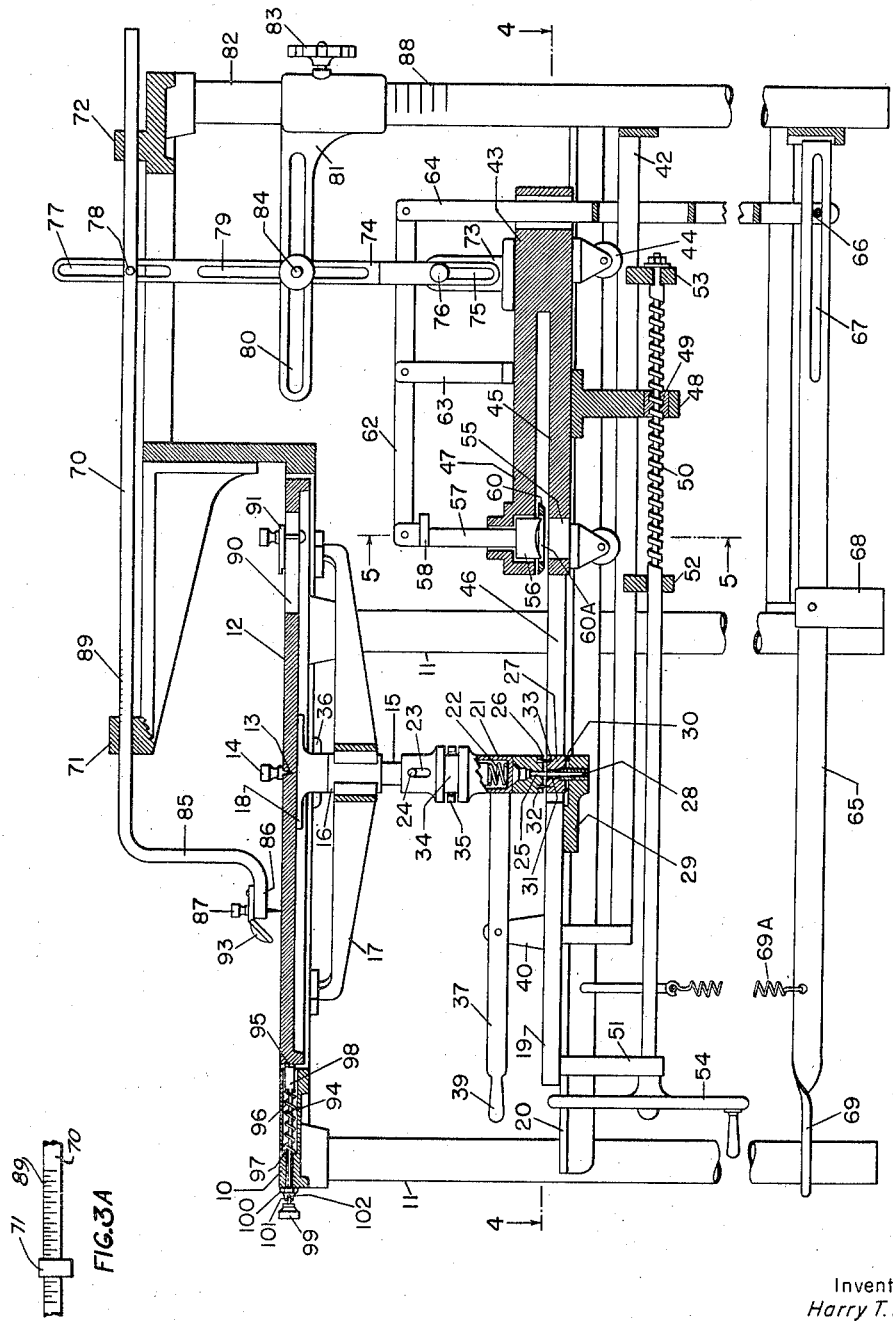

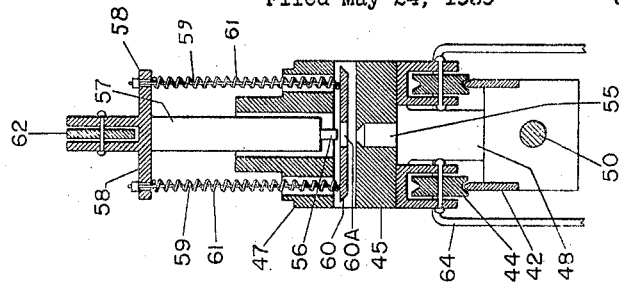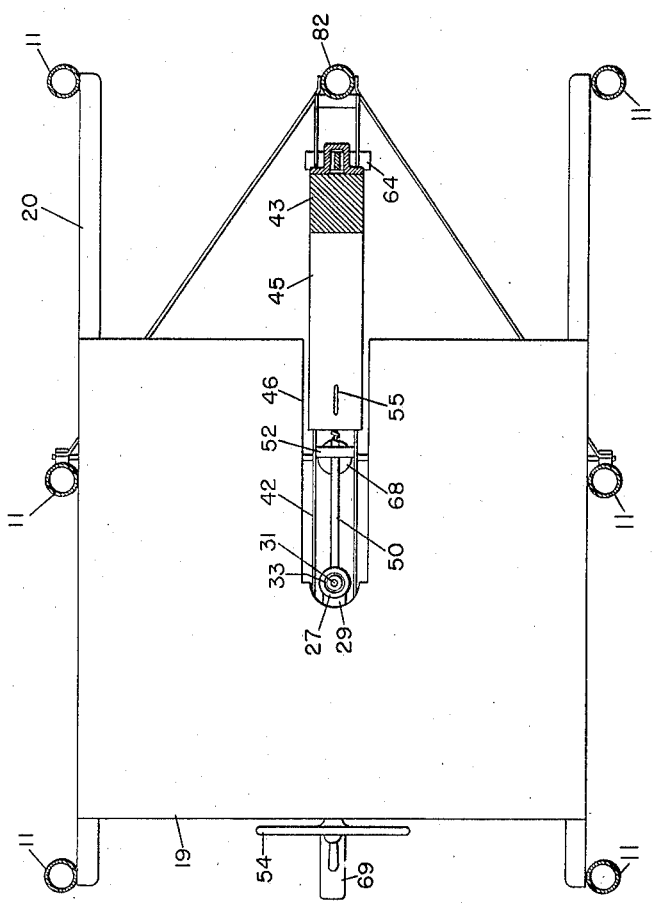

Patented Jan. 7, 1941

2,227,835

UNITED STATES PATENT OFFICE 2,227,835

PUNCHING MACHINE

Harry T. Kelsh and Edward W. Magruder, Washington, D. C.

Application May 24, 1939, Serial No. 275,504

10 Claims. (Cl. 164—87)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a machine for use in connection with the slotted templet method of radial control in compiling maps from aerial photographs. This method is more fully described in United States Patent No. 2,102,612, to which reference is made.

The method referred to requires the construction of a templet of Celluloid, cardboard, or other suitable material, representative of a map area and its central angles, having a central perforation defining the main center point of the map area and radial slots defining the central angles thereof with respect to selected reference points of the map area, by means of which each templet may be mechanically connected with other templets having similar slots related to the reference points. It is necessary for the transverse center line of each individual slot to be approximately the same distance from the azimuth mark on the templet as the radial control points are from the azimuth mark on the corresponding photograph, in case of a direct transference. However, when it is desired to enlarge or reduce the scale of the templet from the scale of the photograph in order to adapt it to the scale of a particular laydown of the map, the distance of each transverse center line from the azimuth mark of the templet must be proportionately larger or smaller, as the case may be.

Templets of this kind were heretofore constructed by securing a blank card over a photograph having the required reference points thereon, care being taken to avoid slippage, and then pricking through the photograph into the templet with a fine needle at the designated points. The photograph was then removed and the center point punched out on the templet. The templet was then placed over a small pin on a hand-cutter (see patent above-referred to) and the die of the cutter centered over each transfer point before punching out the slot. Where a templet of larger or smaller scale was desired, it was necessary to construct radial lines from the center point of the templet after pricking through, and the position of the transverse center line of each desired slot was calculated and marked on each radial line prior to punching out the slot.

One of the objects of this invention is the provision of a machine which will greatly simplify the operation of making slotted templets of the type above-mentioned and at the same time to eliminate errors heretofore encountered as a result of the human factor involved.

Another object of this invention is the provision of a machine capable of making a templet of the type mentioned on any differential scale desired by means of a simple adjustment on the machine and without resorting to computation.

Other objects of this invention comprise the elimination of many of the steps heretofore required in the preparation of slotted templets, such as the steps of pricking through the photograph to the templet; the construction of radial lines where enlargements or reductions of the scale are desired; and, in general, to provide an automatic and more economical machine for accomplishing the precision work required in making slotted templets.

The following description, considered together with the accompanying drawings, will disclose this invention more fully, its constructions, arrangements, and operations of parts, and further objects and advantages thereof will be apparent.

In the drawings:

Figure 1 is a front elevational view of this invention in one of its preferred embodiments.

Figure 2 is a plan view of the embodiment shown in Figure 1.

Figure 3 is an elevational section along the line 3—3 of Figure 2.

Figure 3A is an enlarged plan view of scale 89.

Figure 4 is a section along the line 4—4 of Figure 3.

Figure 5 is an enlarged section along the line 5—5 of Figure 3.

Referring with more particularity to the drawings, in which like numerals designate like parts, the machine comprises the upper or photograph table 10 supported by legs 11. In the face of said table 10, a turntable 12, having a small central aperture 13 adapted to receive a push pin 14, is secured to a vertical shaft 15, which shaft is rotatably mounted in a through-bearing 16, said bearing being formed at the center of a spider bracket 17, said spider bracket being secured to the bottom of the table 10, concentric with the turntable 12, substantially as shown. The shaft 15 is provided with a flange 18 which acts as a collar bearing on top of the bearing 16. Directly below the turntable 12, the lower or templet table 19 is secured to suitable frame members 20 of the machine. The shaft 15 terminates at a suitable distance above the templet table 19 and slidably carries a socket shaft 21. A spring 22 is disposed within the socket shaft 21 between its lower end and the end of the shaft 15 so as to urge the shaft 21 downward. The member 21 is provided with two vertical slots 23, 23 through which bolts 24, 24 respectively, are disposed and secured to the shaft 15, thereby limiting the vertical movement of the member 21, and, also absolutely preventing it from rotating with respect to the shaft 15. The lower end of the member 21 carries a circular male punch member 25 and a friction gasket 26, such as rubber, cork, etc., the member 25 extending through and below said gasket 26. Directly below the end of the member 21, a cylindrical member 27 is rotatably mounted on a vertical stub shaft 28 fixed in a bracket 29 secured to the table 19. Anti-friction means, such as ball bearings 30, are provided between the bracket 29 and the cylindrical member 27. The cylindrical member 27 carries a female die 31 adapted to register with the male punch member 25 for the purpose of punching a central aperture through the templet. The lower end of the member 21 also carries a plurality of short pins 32 adapted to register with a circular groove 33 in the cylindrical member 27 for the purpose of insuring against slippage of the templet when held between member 21 and member 27. The member 21 is provided with a double thrust collar 34 engaged with the bifurcated end 35 of a lever 35A, said lever being fulcrumed on a bracket 36 secured to the table 10. The other end of said lever 35A is connected to the end of operating lever 37 through a link 38, the other end of the lever 37 terminating in front of the machine and being provided with a handle 39, for manual operation. Said lever 37 is fulcrumed to a bracket 40 on the machine at a point between the ends of the lever. A spring 41 may be tensionally mounted between the bottom of the table 10 and any point on the lever 35 near its end attached to the operating lever 37, as a substitute for the spring 22. In either event, the spring 22, if used, or the spring 41 would serve to urge the member 21 downward. While it is only necessary to use one of these springs, both may be used if desired for smooth and positive operation. Beneath the templet table 19, carriage tracks 42 are secured, on which a carriage assembly 43 operates on anti-friction rollers 44. Said carriage assembly 43 consists of a narrow base plate 45, slidable in a slot 46 provided in the templet table 19 immediately behind the die member 27, the upper surface of the member 45 being flush with the upper surface of the templet table 19. Directly above the member 45, a punch arm 47 is secured in fixed spaced relation, optimum for the operation of the punch members hereinafter described. To the bottom of the member 45 a vertical bracket 48 is fixed, carrying a boss 49 in threaded engagement with a screw shaft 50, said shaft being rotatably supported by suitable bearings in brackets 51, 52, 53, said brackets depending from any suitable fixed points of the machine, such as the templet table 19 and the carriage track members 42. The rear end of the shaft 50 is prevented from moving axially by suitable abutment means operating against any of the brackets by which it is carried. The front end of the shaft 50 extends through the bearing in the bracket 51 to which end a hand wheel 54 is fixed or the purpose of manually imparting rotation to the shaft 50. By these means, the carriage 43 may be actuated along the carriage tracks 42 by the operator. In the forward end of the member 45 a female slot die or opening 55 is formed. Directly above this, through the member 47 a male slot die 56 is fixed on the end of a vertical reciprocating ram 57, said die 56 being adapted to register with the female die 55. The ram 57 is provided with flanges 58, 58 with which rods 59, 59 are slidably engaged, said rods running through the member 47 and being secured to a holding platen 60, said platen having an aperture 60A therethrough for the passage of said male die member 56. Springs 61, 61 are mounted between said flanges 58, 58 and holding platen 60 through the member 47. This arrangement is for the purpose of providing a means for holding the templet secure against the female die member 55 prior to the actuation of the male die member 56. The upper end of the ram 57 is pivoted to the end of a lever 62, the lever 62 being fulcrumed to a bracket 63 secured to the top of the member 47, substantially as shown. The other end of the lever 62 is pin-connected to the upper end of a connecting link 64. The lower end of the connecting link 64 is secured to an operating foot lever 65 by a lost motion connection, such as the pin 66 in the link 64 and slot 67 in the lever 65, substantially as shown in the drawings. The operating lever 65 is fulcrumed to a bracket 68, said bracket depending from or being secured to any suitable fixed point. If desired, the bracket 68 may rest directly on the floor, as shown in the drawings. The other end of the lever 65 on the opposite side of the bracket 68 is provided with a foot plate 69 for actuation by the foot of the operator. A spring 69A is tensionally mounted between a suitable fixed point of the machine and a point on the lever 65 near the foot plate 69 for urging the ram 57 upward. A pointer arm 70 is slidably mounted on suitable brackets 71 and 72 over the photograph table 10, its direction of motion being parallel to the direction of motion of the carriage 43. A bracket 73 is secured to the top of member 47 to which bracket is secured one end of a link 74 through a lost motion connection illustrated by a longitudinal slot 75 in said link 74 and a pin 76. The other end of the link 74 is also connected with lost motion to the pointer arm 70 by means of the longitudinal slot 77 and the pin 78. The midportion of the link 74 is provided with another longitudinal slot 79, intersecting a horizontal slot 80 in a bracket 81, said bracket being adjustably secured to a vertical fixed post 82, the bracket 81 being elevationally adjustable on said post 82. A set screw 83 is provided for locking the bracket in selected positions on the post 82. The link 74 is fulcrumed to the bracket 81 by means of a pin 84 slidably in the slot 79 and adjustably secured in selected positions in the slot 80. By means of these connections, the pointer arm 70 is motivated counter to the carriage 43 by the operation of the hand wheel 54. The forward portion 85 of the pointer arm 70 is bent downward, the end 86 of which is bent forward, substantially as shown, just above the turntable 12, carrying a screw pointer 87 adjustable to the face of the turntable 12. The arm 70 is adjusted so that if the center of the die 56 were over the center of the die 25, the point of the member 87 would be at the center of the turntable 12. However, this is only a theoretical situation since the member 21 does not permit the carriage 43 to move into that position. Consequently, the member 87 is not centerable over the turntable 12, there being normally a definite minimum offset from it to the center of the turntable equal to or proportionate to the minimum distance between the center of the die 25 and the center of the die 56. These distances are equal when the scale ratio being used is unity and proportionate for scale ratios other than unity. For a unity scale ratio, the pin 84 is midway between the effective ends of the link 74. To change the scale ratio, it is only necessary to raise or lower the bracket 81 by means of the set screw 83, a scale 88 being provided on the post 82, to indicate scale changes and to assist the operator in making them. If it were possible to bring the pointer 87 in vertical alignment over the die 56, it would not be necessary to have the slot 80. However, in view of the fact that the pointer 87 and the center of the die 56 are offset on opposite sides of the vertical line through the center of the turntable 12, having thus oppositely offset points of origin, it is necessary to provide some means for proportionately adjusting these points of origin when scale changes are desired. This is accomplished by the slot 80. After loosening the pin 84 and adjusting the bracket 81, the distance of the pointer 87 from the center of the turntable 12 is proportioned to the distance of the center of the die 56 to the center of the die 25 according to the scale change desired. For example, a scale ratio for a 2 to 1 enlargement would require the distance of the point of origin of the center of the die 45 from the vertical center line of the turntable 12 to be twice that of the distance of the point of origin of pointer 87 from said vertical center line. To facilitate this, a scale 89 may be provided on the pointer arm 70 with reference to any fixed point, such as the bracket 71.

The turntable 12 is provided with a plurality of radial slots 90 in each of which a clamp member 91 is slidably mounted for the purpose of removably holding a photograph or other referenced representation on the table. If desired, a magnifying glass 93 may be secured to the end of the pointer arm 70 over the tip of the pointer 87 to permit closer adjustment than is possible with the naked eye. It is also desirable to provide a friction clutch or any other suitable means for securing the turntable 12 in selected positions, the means showing in the drawings being a shaft 94 mounted through the edge of the table 10, tipped with a piece of leather 95 or other suitable friction material, normally urged against the edge of the turntable 12 by means of a spring 96, said spring being compressibly mounted between an abutment 97 of the table and a spring header 98 secured to the shaft 94, substantially as shown. The outer end of the shaft 94 is provided with a knob 99 to facilitate drawing it out against the action of the spring 96 and away from contact with the turntable 12. Means are provided for holding the shaft 94 out of contact with the turntable 12, said means consisting of a sleeve 100 secured to the edge of the table 10 having axial open slots 101 and a pin 102 secured through shaft 94 adapted to register with said slots 101 when the shaft is in one position and with the outer edge of the member 100 when the shaft 94 is slightly turned.

The operation of this invention is as follows: The machine is set for the desired scale ratio desired, as above described, and a photograph of the type above mentioned having the required reference points designated thereon is secured on turntable 12 with its central aperture coinciding with the central aperture 13 of the turntable. The photograph is secured in this position by means of the push pin 14. The clamp members 91 further secure the photograph on the turntable 12 and prevent it from moving during the operation. A templet blank, such as a sheet of cardboard, Celluloid, or other suitable material is placed on the templet table 19 over the member 27 and oriented to approximately the same position as the photograph secured to the turntable. To insert the templet blank in this position, it is necessary to first elevate the socket shaft 21 and lower it again, after the blank templet is inserted, thereby punching out the center aperture in the templet and fixing it to the rotatable member 27. Consequently, any rotation of the turntable automatically rotates the templet held between the member 27 and the friction member 26. The handwheel 54 and the turntable 12 are then actuated so as to bring in coincidence one of the reference points on the photograph with the pointer 87. When this is accomplished, the operator presses with his foot on the plate 69 against the action of the spring 69A, which, through the link 64 and lever 62 urges the die member 56 through the templet blank, thereby cutting out a slot. The operator then releases his foot from the foot plate 69, which causes the spring 69A to elevate the die member 56. The operator then brings another reference point of the photograph on the turntable in coincidence with the pointer 87 and repeats the operation. This is done for each reference point on the photograph. The templet is then removed, and the slots thereof designated with the proper reference marks for identifying the templet.

The above-described invention is susceptible to many modifications within the scope of one merely skilled in the art and it is to be understood that such modifications are within the scope and spirit of this invention.

Having thus described our invention, we claim:

1. A punch machine comprising a turntable, a pointer movable over said turntable, means below said turntable for clamping material to be punched rotatably with said turntable, positive means for punching an aperture through said material, means for punching through said material along lines radial to said aperture, and a linkage system for constraining the movements of said last-mentioned means counter to said pointer.

2. A punch machine comprising a turntable, a pointer movable along a diameter of said turntable, means for clamping a referenced representation on said turntable, means below said turntable for clamping material to be punched rotatably with said turntable, means for punching an aperture through said material, means for punching through said material along lines radial to said aperture, and a linkage system for constraining the movements of said last-mentioned means counter to said pointer.

3. A punch machine comprising a turntable, a pointer movable over said turntable, means below said turntable for clamping material to be punched rotatably with said turntable, means for punching an aperture through said material, means for punching through said material along lines radial to said aperture, a linkage system for constraining the movements of said last-mentioned means counter to said pointer, and means for changing the rate of movement of said pointer with respect to said radial punching means.

4. A punch machine comprising a turntable, a pointer movable over said turntable, means for braking said turntable in selective positions, means below said turntable for clamping material to be punched rotatably with said turntable, means for punching an aperture through said material, means for punching through said material along lines radial to said aperture, and a linkage system for constraining the movements of said last-mentioned means counter to said pointer.

5. A punch machine comprising a turntable, a pointer movable over said turntable, a vertical shaft concentrically fixed to the bottom of said turntable, a socket shaft slidably mounted on the end of said vertical shaft, a spring compressibly mounted between the ends of said shafts urging said socket shaft downward, a die member secured to the bottom of said socket shaft, a member mateable with said die member mounted for rotation below said die member, friction means on the end of said socket shaft, means for selectively elevating said socket shaft on said vertical shaft against the action of said spring, a slot punching assembly translatively disposed along a line radial to said die member, means for actuating said assembly, and a linkage system for constraining the movements of said pointer counter to said assembly.

6. A machine for making slotted templets comprising a turntable for holding a referenced representation, a pointer movable over said turntable, an assembly rotatable with said turntable for holding a templet blank and positive means associated with said assembly for punching an aperture through said templet blank, a slot punching assembly translatively disposed along a line radial to said first-mentioned assembly, means for actuating said slot punching assembly, and a linkage system for constraining the movements of said pointer counter to said assembly.

7. A machine for making slotted templets comprising a turntable for holding a referenced representation, a pointer movable over said turntable, an assembly rotatable with said turntable for holding a templet blank and punching an aperture therethrough, a slot punching assembly translatively disposed along a line radial to said first-mentioned assembly, means for actuating said slot punching assembly, a linkage system for constraining the movements of said pointer counter to said assembly, and means for changing the rate of movement of said pointer with respect to said slot punching assembly.

8. A machine for making slotted templets comprising a frame, a table on said frame, a turntable in the face of said table, a pointer movable over said turntable, a pointer arm secured to said pointer, an assembly rotatable with said turntable for holding a templet blank and punching an aperture therethrough, a slot punching assembly disposed for translation along a line radial to said first-mentioned assembly, means for operating said slot punching assembly, a link pivoted to a fixed point on said slot punching assembly by means of a lost motion connection, the other end of said link being pivoted to said pointer arm by means of a lost motion connection, said link having a longitudinal slot in its middle portion, a vertical adjustable bracket disposed on the frame of the machine, said bracket carrying a horizontal slot, and a pin adjustably secured in said horizontal slot and slidably engaged with the slot of said link.

9. A machine as described in claim 6 in which the slot punching assembly comprises an upper jaw and a lower jaw in fixed spaced relation, a vertical ram slidable through said upper jaw, a male slot die on the lower end of said ram, a die member in said lower jaw mateable with said male slot die, pin rods slidably engaged parallel to said ram, a platen secured to the lower ends of said rods, said platen having a slotted aperture therethrough for the passage of said male slot die, resilient means for urging said platen downward with respect to said ram, and a linkage system for actuating said ram.

10. A machine for making slotted templets comprising a turntable for holding a referenced representation, a pointer movable over said turntable, an assembly rotatable with said turntable for holding a templet blank and positive means associated with said assembly for punching an aperture through said templet blank, carriage tracks fixed to the frame of the machine in a direction radial to said assembly, a slot punching assembly mounted for translation on said tracks, means for translating said assembly, means for actuating the slot punching mechanism of said assembly in any position along said tracks, and a linkage system for constraining the movements of said pointer counter to said assembly.

HARRY T. KELSH.
EDW. W. MAGRUDER.